G. W. RAY.
CORN HUSKING IMPLEMENT.
APPLICATION FILED NOV. 12, 1918.

1,296,120.

Patented Mar. 4, 1919.

Inventor:
George W. Ray,
By Munn & Co.
Attorneys.

UNITED STATES PATENT OFFICE.

GEORGE W. RAY, OF NIAGARA FALLS, NEW YORK.

CORN-HUSKING IMPLEMENT.

1,296,120.  Specification of Letters Patent.  Patented Mar. 4, 1919.

Application filed November 12, 1918. Serial No. 262,166.

*To all whom it may concern:*

Be it known that I, GEORGE W. RAY, a citizen of the United States, and a resident of Niagara Falls, county of Niagara, and State of New York, have invented certain new and useful Improvements in Corn-Husking Implements, of which the following is a specification.

My present invention relates generally to corn husking implements, and more particularly to a simple, inexpensive implement of this character having certain advantages in its construction as well as in use, which I will proceed to describe in connection with the accompanying drawing forming a part of the specification, and wherein—

Figure 1:
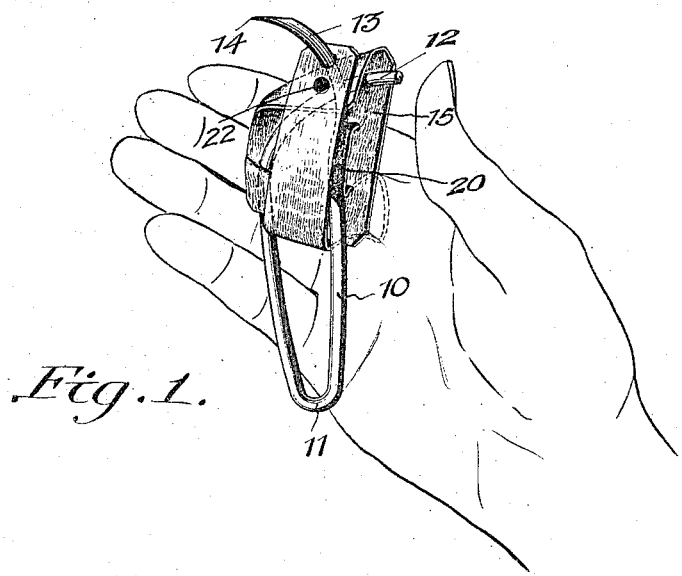
Figure 2:
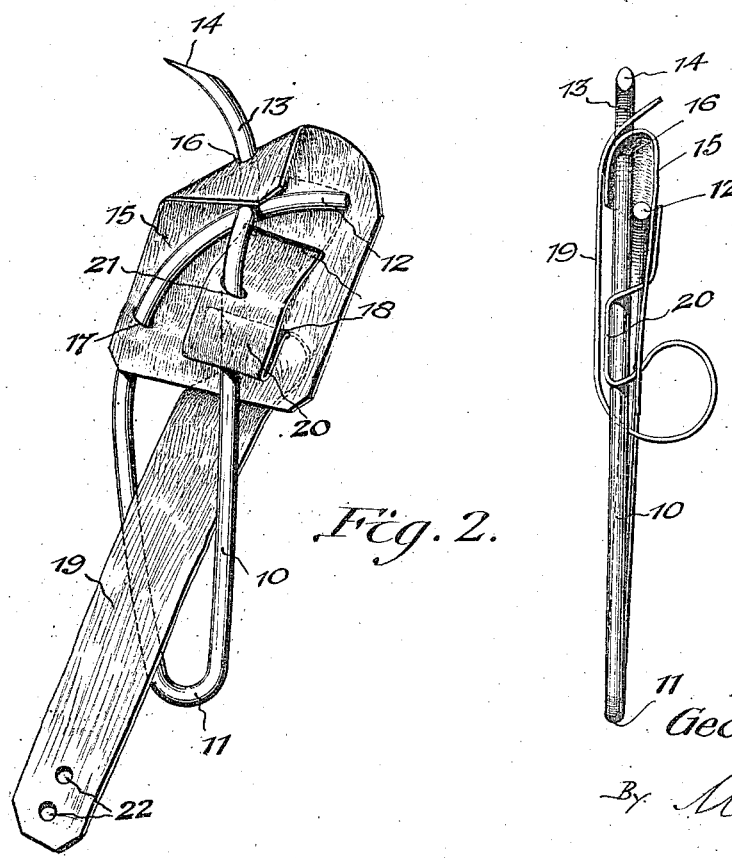
Figure 3:
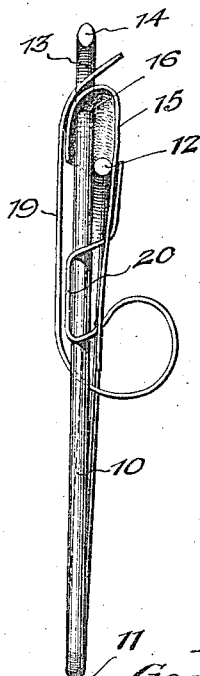

Figure 1 is a perspective view illustrating the practical application of the invention, Fig. 2 is a perspective view with the free end of the strap released, and Fig. 3 is a side view with the several parts in the operative position shown in Fig. 1.

Referring now to these figures, my invention discloses a corn husking implement which consists of a single section of wire bent to form an elongated loop 10, closed at its lower end at 11, and having its free ends crossing one another at the upper end of the loop and provided with extensions 12 and 13 to be presently described.

The loop 10 thus formed constitutes a handle which is disposed flatwise within the hand in use, at or adjacent the inner ends of the fingers, and in such position the extension 12, which curves rearwardly from one side of the loop 10, between the adjacent side of the loop and the hand, and which is thus drawn slightly out of the plane of the handle, partially overlies the extreme inner portion of the index finger so as to steady the husker in its effective position within the hand, and particularly when it is in active use.

The other extension 13 is curved upwardly and forwardly in the plane of the major portion of the body of the handle, or in other words of the loop 10, and terminates in a flattened upper portion at 14 forming a sharpened husk engaging hook, the extremity of which terminates approximately in the plane of the longitudinal axis of the handle or loop 10 as most clearly seen by reference to Fig. 2.

With the implement so constructed, and forming a part thereof, is a generally rectangular pad 15 having openings in its upper and lower portions at one side, at 16 and 17 respectively, receiving therethrough the extension 13 which carries the husking hook, and that side of the loop 10 from which the extension 12 projects. Adjacent its opposite side and at vertical spaced points, the shield or pad 15 has transverse slots 18 through which one end of a strap 19 is extended to form a loop 20 upon that side of the pad adjacent the handle of the implement, having spaced openings 21 through which is extended that side of the loop 10 from which the extension 13 projects. The opposite free end of the strap 19 has openings 22 and extends in use through the loop 10, and upwardly so as to engage openings 22 over the extension 13 as seen in Figs. 1 and 3, the straps so extended being first drawn around the middle finger, as seen in dotted lines in Fig. 1 so as to thus connect the implement with the hand and support the same upon the hand as seen in Fig. 1 without the necessity of a tight grip thereon at times when the implement is not in use.

Thus from the foregoing it is obvious that the pad and finger strap are so connected with the handle of the implement as not only to position the pad exactly where its functions are most needed, and join the implement to the hand in so far as actually required, but is such as to do this without stitching or riveting, or the employment of buckles and other metallic connecting devices, while at the same time possessing strength, firmness, rigidity and convenience to be desired in such implements used in the hand for long hours at a time.

I claim:

1. A corn husker having a handle in the form of a wire loop provided with an extension beyond one end thereof provided with a husking hook, a pad disposed against one side of the handle, a strap having one end thereof associated with the pad, said pad having openings adjacent one another to receive portions of the wire loop, and also having slits through which the said strap is extended at one end, and said strap having openings adjacent its opposite free end for the reception of the said extension of the handle carrying the husking hook.

2. A husking implement consisting of a single piece of wire bent to form an elongated loop constituting a handle, the end portions of which wire are curved inwardly toward and across one another at one point of crossing, their curvature continuing regularly beyond said end of the loop in opposite directions and in approximately the plane of the loop, one of said continuing end portions being deflected slightly in a lateral direction to overlie the base of the forefinger when the handle is disposed flatwise in the hand in use, and the other of which continuing end portions has a husking hook curved toward the end of the forefinger and provided with a sharpened extremity terminating approximately in the line of the longitudinal axis of the loop.

GEORGE W. RAY.

Witnesses:
IRENE F. METZ,
GLENN A. STOCKWELL.

Copies of this patent may be obtained for five cents each, by addressing the "Commissioner of Patents, Washington, D. C."